Figure 1:
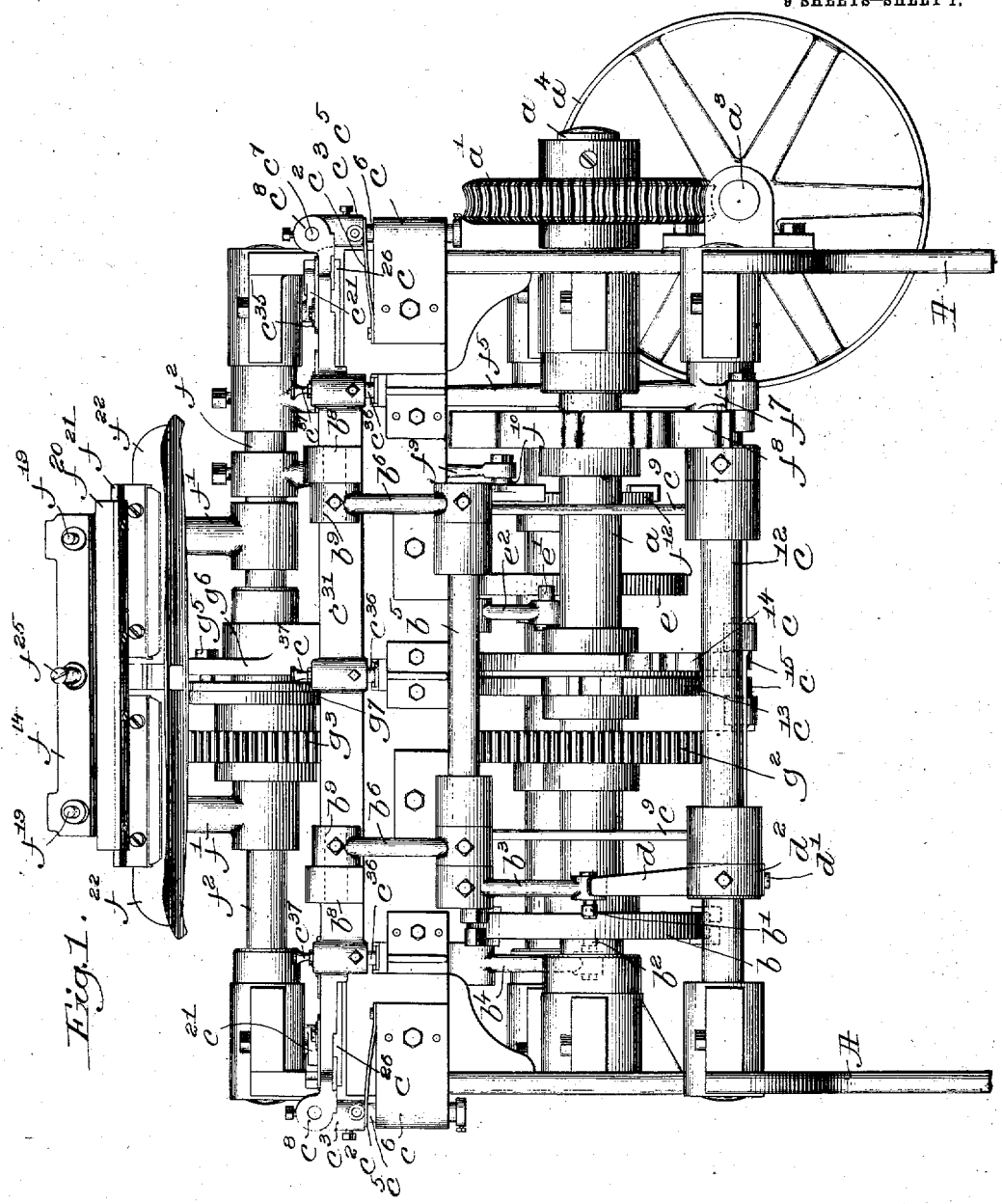

G. REECE.
COLLAR AND CUFF FOLDING MACHINE.
APPLICATION FILED JUNE 13, 1900.

972,916.

Patented Oct. 18, 1910.
9 SHEETS—SHEET 1.

Witnesses:
W. C. Lunsford.
Fred S. Greenhof.

Inventor:
George Reece.
By Bradby & Gregory
Attys.

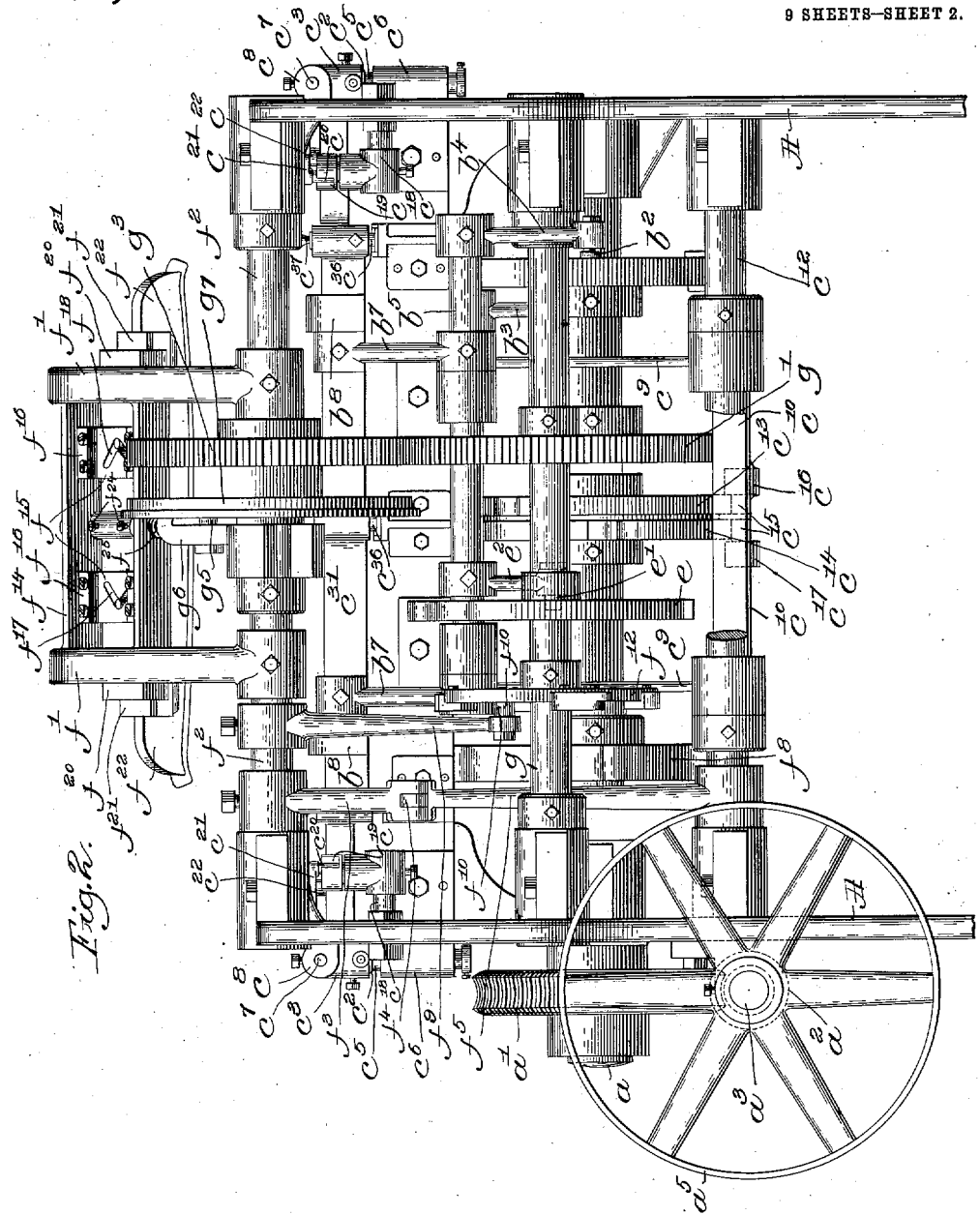

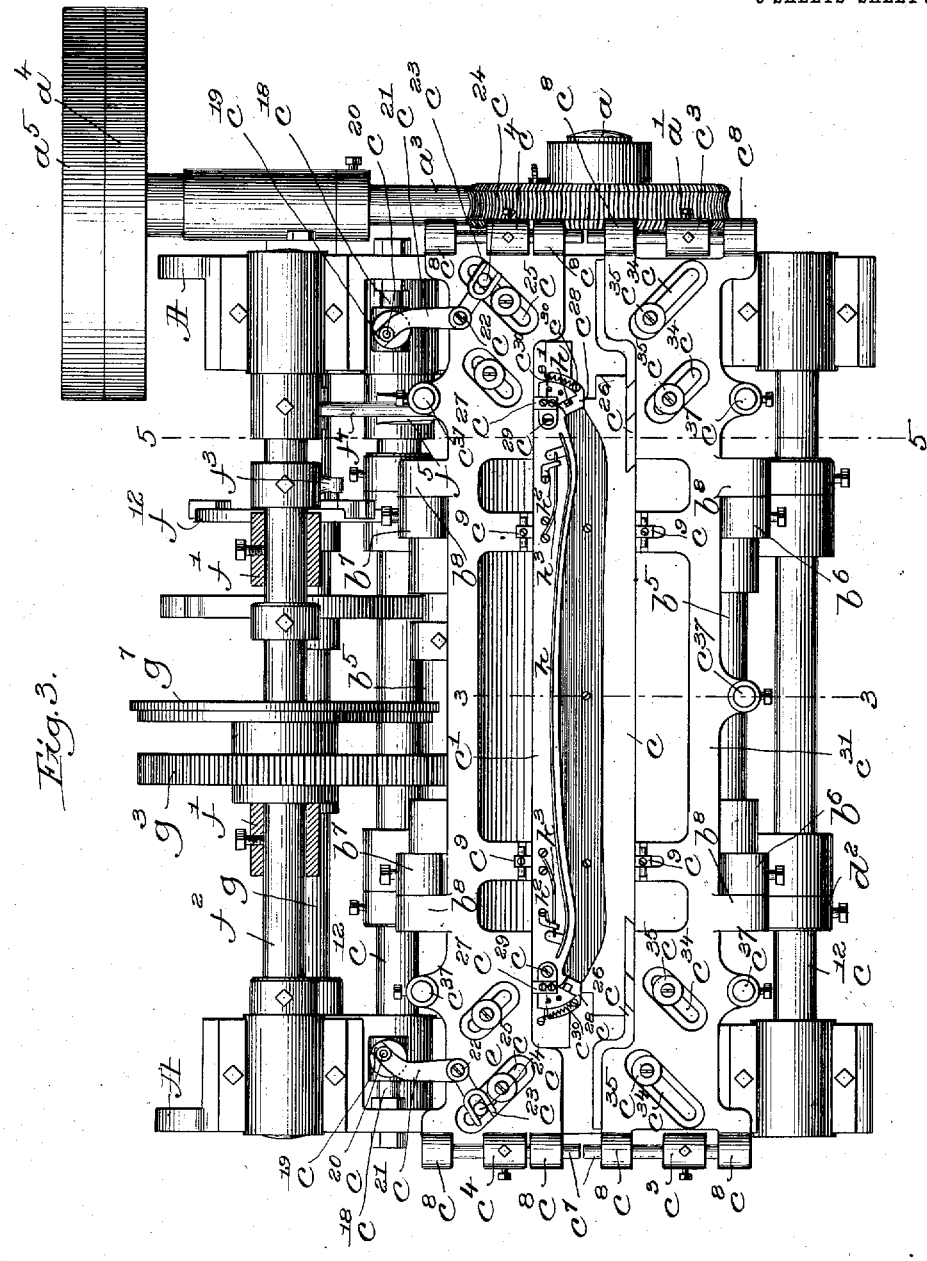

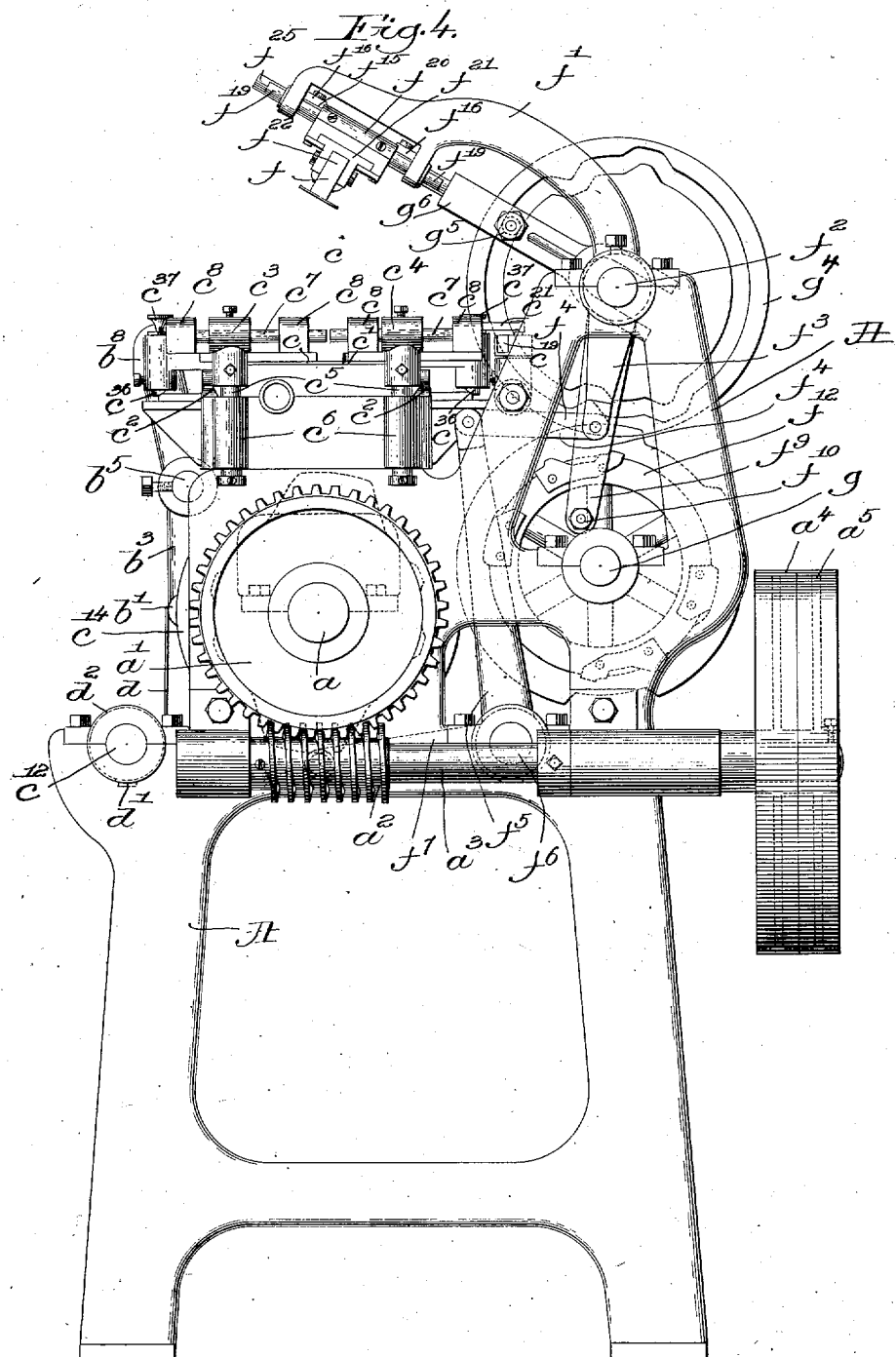

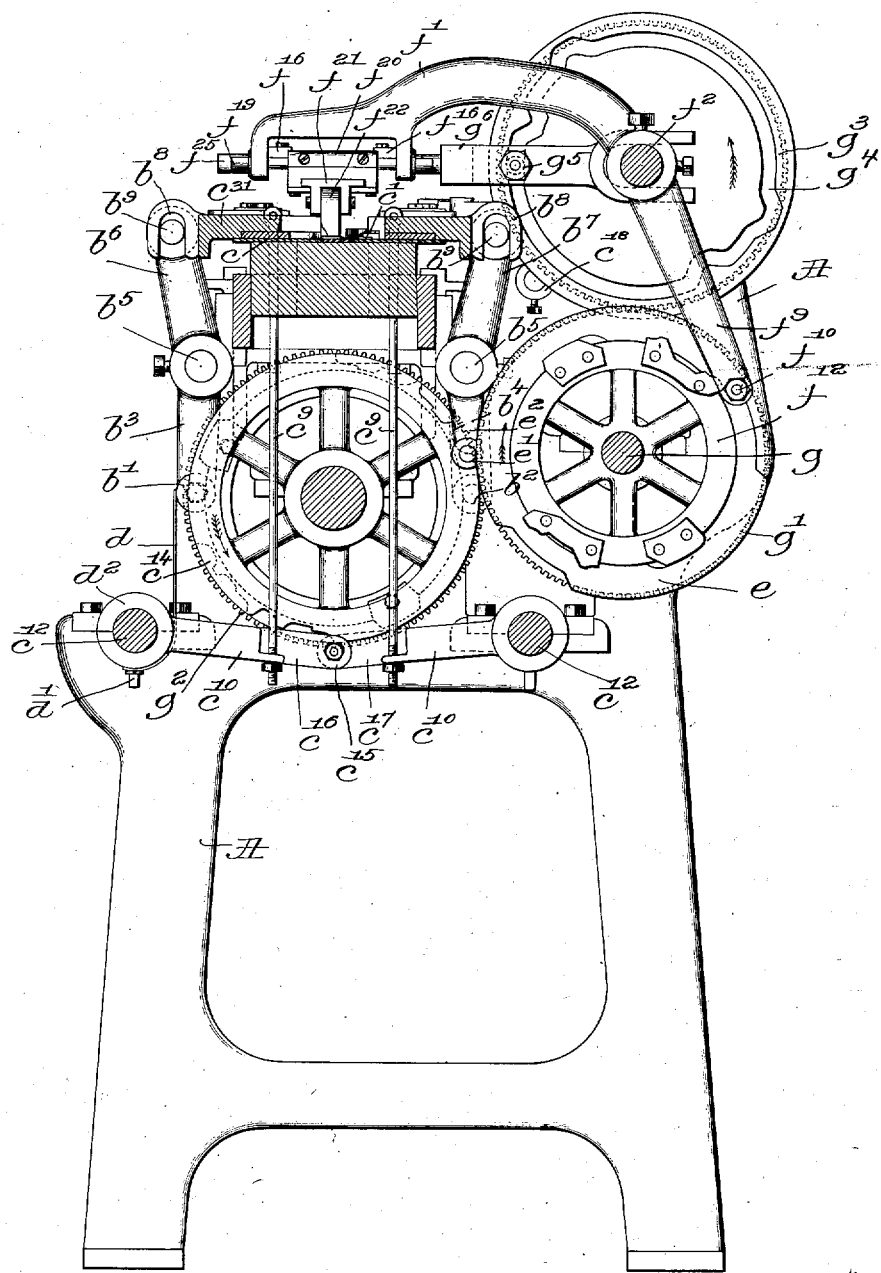

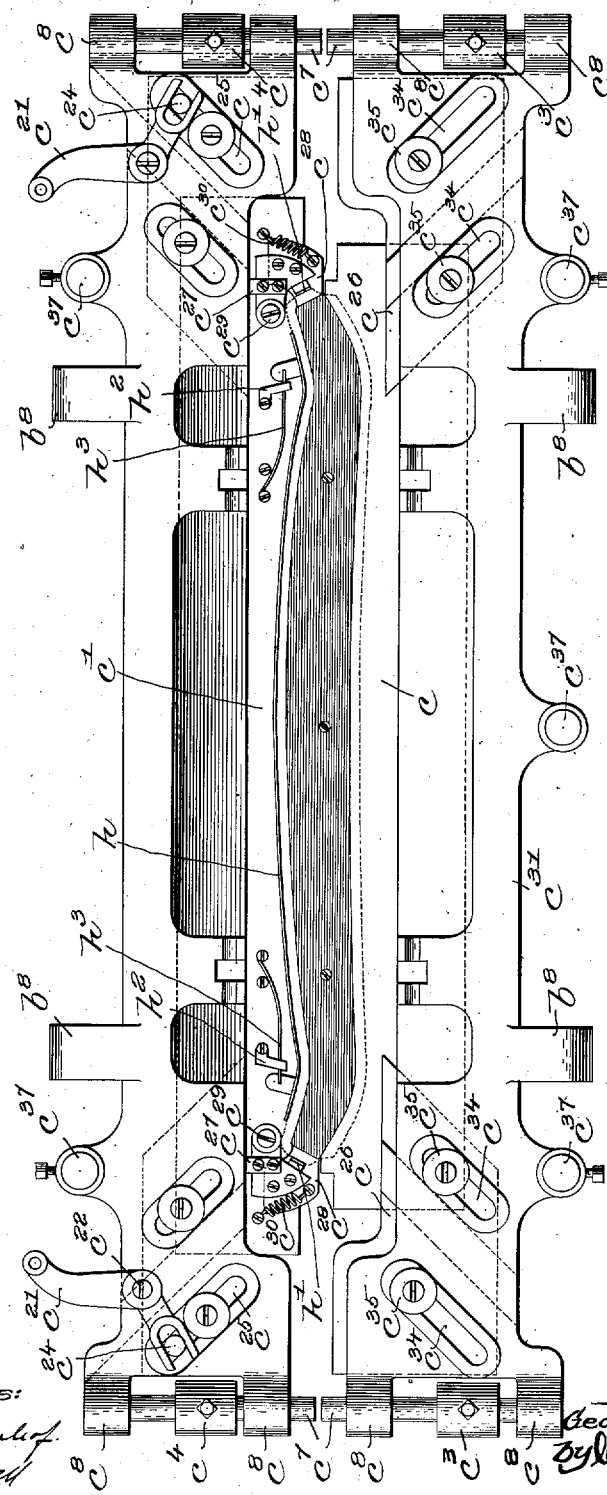

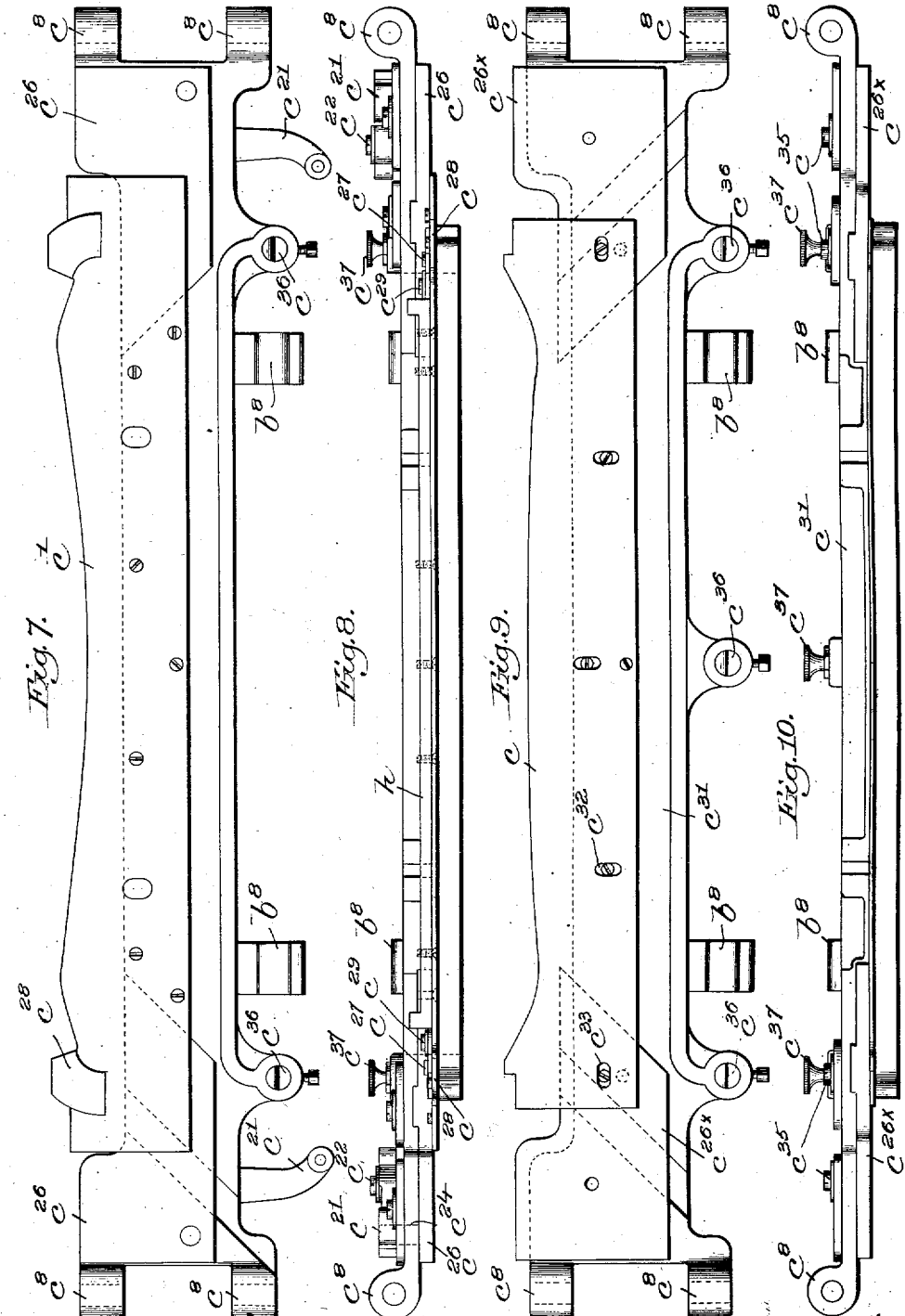

G. REECE.
COLLAR AND CUFF FOLDING MACHINE.
APPLICATION FILED JUNE 13, 1900.
972,916.
Patented Oct. 18, 1910.
9 SHEETS—SHEET 8.
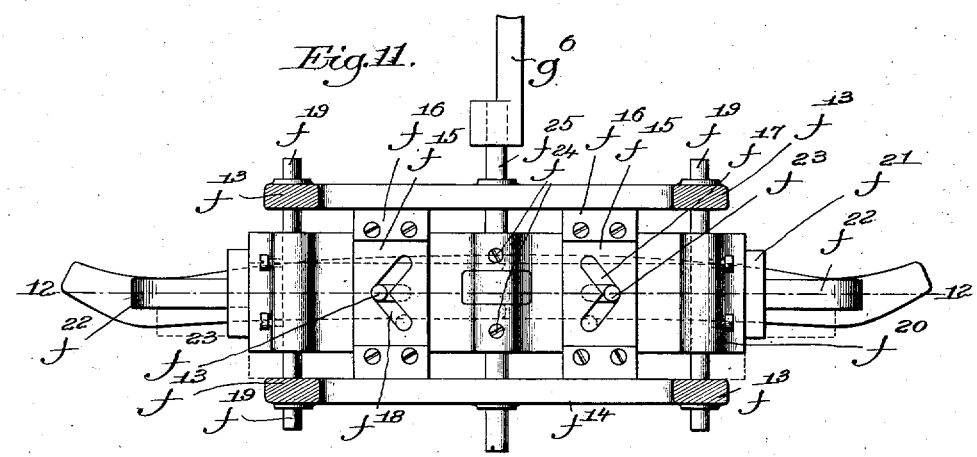
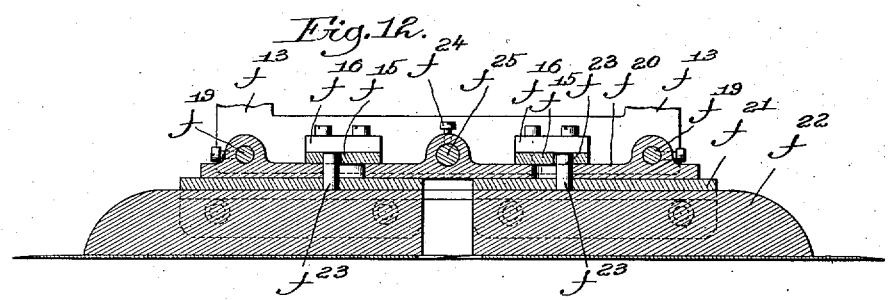
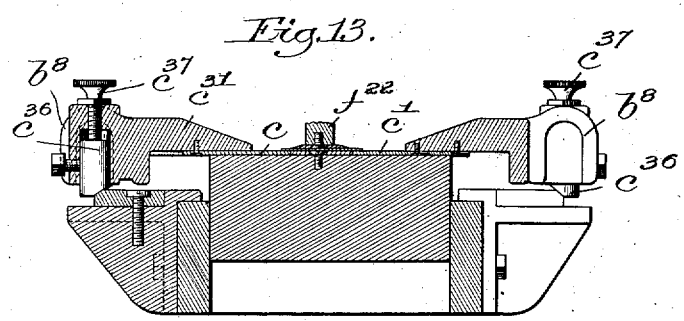
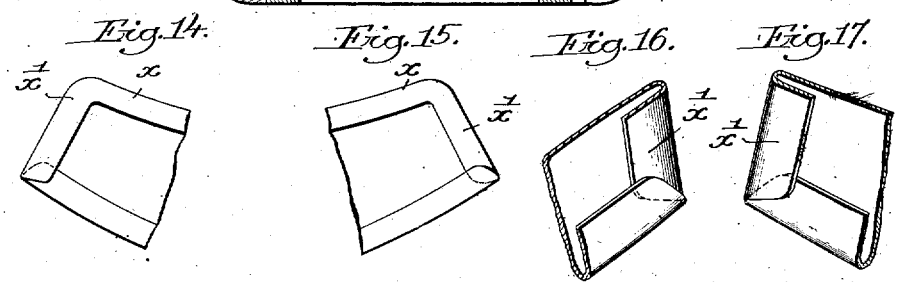
Witnesses:
W. C. Lunsford
Fred S. Greenby
Inventor.
George Reece.
By Greenby Gregory
Attys.

G. REECE.
COLLAR AND CUFF FOLDING MACHINE.
APPLICATION FILED JUNE 13, 1900.
972,916.
Patented Oct. 18, 1910.
9 SHEETS—SHEET 9.
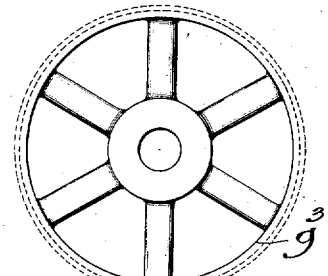
Fig. 18.
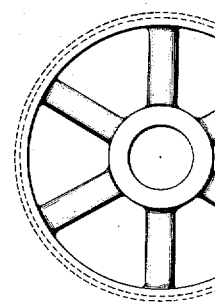
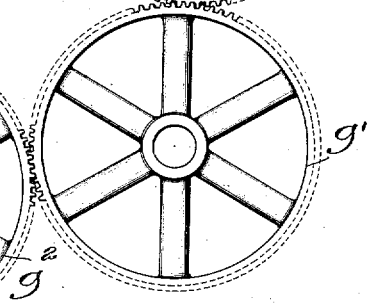
Fig. 19. Fig. 20. Fig. 21.
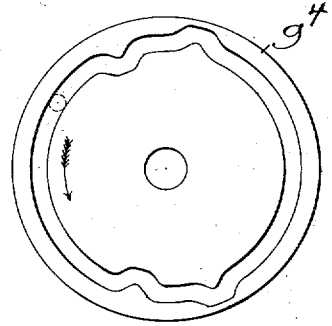
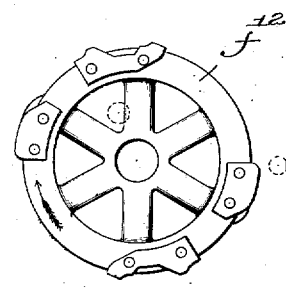
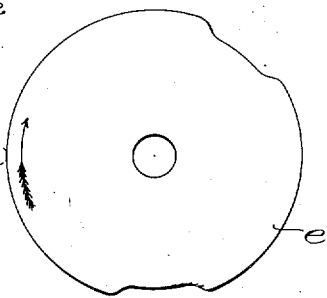
Fig. 22. Fig. 23. Fig. 24.
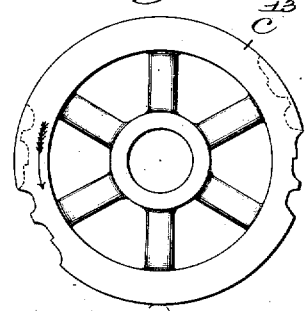
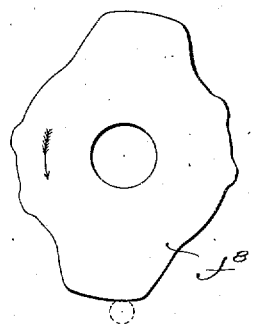
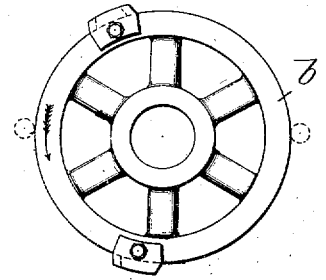
Witnesses:
W. C. Lunsford
Fred L. Grunbert
Inventor.
George Reece.
by Crosby & Gregory attys.

UNITED STATES PATENT OFFICE.

GEORGE REECE, OF WOLLASTON, MASSACHUSETTS, ASSIGNOR TO REECE FOLDING MACHINE COMPANY, OF PORTLAND, MAINE, AND BOSTON, MASSACHUSETTS.

COLLAR AND CUFF FOLDING MACHINE.

972,916.  Specification of Letters Patent.  Patented Oct. 18, 1910.

Application filed June 13, 1900. Serial No. 20,125.

*To all whom it may concern:*

Be it known that I, GEORGE REECE, a citizen of the United States, residing at Wollaston, county of Norfolk, State of Massachusetts, have invented an Improvement in Collar and Cuff Folding Machines, of which the following description, in connection with the accompanying drawings, is a specification, like letters on the drawings representing like parts.

My invention is an improved mechanism for folding collars and cuffs and the like.

The details of construction, various points of novelty, and mode of operation of my invention will be pointed out in the course of the following description, reference being had to the accompanying drawings, in which I have illustrated a preferred form of mechanism.

In the drawings, Figure 1 is a front elevation of my machine. Fig. 2 is a rear elevation thereof. Fig. 3 is a top plan view thereof, parts being in section to show the construction to better advantage. Fig. 4 is a right hand end elevation. Fig. 5 is a vertical cross section taken on the line 5—5, Fig. 3. Fig. 6 is an enlarged detail, in top plan, of the folding blades. Fig. 7 is a bottom plan view of the back folding blade. Fig. 8 is a front elevation thereof. Fig. 9 is a bottom plan view of the front folding blade. Fig. 10 is a rear elevation thereof. Fig. 11 is a horizontal section showing the holder or die and the operative mechanism in top plan. Fig. 12 is a longitudinal vertical section thereof, taken on the line 12—12, Fig. 11. Fig. 13 is an enlarged vertical cross section, taken on the line 3—3, Fig. 3. Figs. 14, 15, 16 and 17 are views in plan and perspective, showing details of the folds made by my machine. Figs. 18 to 24 show in side elevation certain details of cams and gears.

According to the present embodiment of my invention I employ a pivoted crosshead for carrying the former or die, which at proper times is caused to swing said die down or up as desired, the die being collapsible endwise and operated preferably by a cam carried on the rock shaft which swings the die, and the folding operations are performed by folding one edge and the adjacent ends at one operation, and the other edge at another operation. It will be understood, however, that various features of my machine are adaptable to a different order of operation and to folding other forms of blanks, the machine as herein shown being made for folding collar bands.

In order that the machine and its operations may be fully understood it will be necessary for me to explain many details which are not specifically new.

In a suitable frame A I mount a drive shaft $a$ provided at its outer end with a worm wheel $a'$, driven by a worm $a^2$, on a shaft $a^3$, provided with fast and loose belt pulleys $a^4$, $a^5$. The shaft $a$ at its left hand end, Fig. 1, has a cam or double cam $b$, whose cam projections are engaged on opposite sides of the machine by rolls $b'$, $b^2$, carried by the free ends of arms $b^3$, $b^4$, of rock shafts $b^5$, whose upwardly projecting arms $b^6$, $b^7$, serve to move inwardly the front and rear edge folders $c$, $c'$. Said folders are respectively moved outwardly by a spring $d$ secured at $d'$ on a hub $d^2$ and bearing against the roll $b'$, and by a cam $e$ engaging a roll $e'$ of an arm $e^2$ fixed on the rear rock shaft $b^5$. The folding blades are connected to the actuating arms $b^6$, $b^7$, by any kind of loose connection, being herein shown as provided with U-shaped portions $b^8$ loosely engaging pins $b^9$ at the free ends of said arms. Said folding blades are maintained under a normal tendency to rise by means of lifting springs or other mechanism $c^2$, said folding blades at their ends being supported in brackets $c^3$, $c^4$, whose stems $c^5$ are free to move up and down in sockets $c^6$ in the ends of the frame, said brackets $c^3$, $c^4$ being transversely perforated at their upper ends to receive slide rods $c^7$ secured to the folding blades in ears $c^8$ so as to permit the said blades to move freely in and out toward the blank being folded, while at the same time preventing any endwise inaccuracy or shifting movement of the blades. The folding blades are brought down firmly for folding and creasing operations at proper times by means of rods $c^9$ pivotally connected adjacent the front portions of the folding blades and adjustably mounted at their lower ends in arms $c^{10}$ secured on rock shafts $c^{12}$ actuated by the engagement of cams $c^{13}$, $c^{14}$, with rolls $c^{15}$ at the free ends of arms $c^{16}$, $c^{17}$, fast on said rock shafts $c^{12}$.

The former or die $f$ is carried in the free end of supporting arms $f'$ freely pivoted on a shaft or axle $f^2$ and caused to rise and fall by an arm $f^3$ connected by a link $f^4$ to an arm $f^5$ of a bell crank lever pivoted at $f^6$ and having its opposite arm $f^7$ actuated by a cam $f^8$ on the drive shaft. It is desirable that the die or former $f$ should at certain times be pinched forcibly or with extreme pressure against the blank being folded, and accordingly for this purpose I have provided an auxiliary actuating arm $f^9$, whose roll $f^{10}$ is engaged at suitable times by the cam projections of a cam $f^{12}$ mounted on a shaft $g$. The latter shaft also carries a gear $g'$ in mesh with a gear $g^2$ on the drive shaft and serving to transmit motion to a second gear $g^3$ on the shaft $f^2$. Adjacent this second gear and fast on said shaft is a face cam $g^4$, see Fig. 19, in whose cam path travels a roll $g^5$ projecting from an arm $g^6$, whose rear end is bifurcated, as clearly shown in Fig. 4, to straddle and be guided by the shaft $f^2$. This latter mechanism serves to operate the collapsible die, the details of which are shown in Figs. 11 and 12, where it will be seen that the die carrier frame or free end of the arms $f'$ comprise depending ears or pieces $f^{13}$ constituting hangers and cross pieces $f^{14}$, between which are secured cam plates $f^{15}$, $f^{16}$, provided with oppositively disposed V-shaped cam slots $f^{17}$, $f^{18}$, and the ends of the frame at the depending parts $f^{13}$ loosely receive slide bars $f^{19}$ rigidly secured in and serving to support the die carrier $f^{20}$ or means for shifting the die with a compound movement resulting from having this part $f^{20}$ shiftable in one direction, in which direction, at the same time, it tends to move the die, the latter being however, deflected obliquely by the slots $f^{17}$, $f^{18}$ which contain studs $f^{23}$ connected with the die. The die carrier $f^{20}$ has a T-shaped recess on its under side, see Fig. 5, in which is mounted a T-shaped upper end $f^{21}$ of the die back $f^{22}$, to the lower edge of which is secured the die proper. The die backs have studs $f^{23}$ operating in the cam grooves $f^{17}$, $f^{18}$, and the die carrier $f^{20}$ is fastened by set screws $f^{24}$ to the free end $f^{25}$ of the beforementioned shifting arm $g^6$, the result being that when said arm is moved forward by its cam $g^4$ the two parts or sections of the die are first separated until the parts get into the position shown in full lines in Fig. 11, and a further forward movement then causes them to contract, the same movement being repeated on the reverse or backward operation. This compound movement is due to the fact that as the die shifter, or slide plate or member $f^{20}$ is shifted forward when the arm $g^6$ is actuated, it in turn coöperates with the oblique cam slots or surfaces $f^{17}$, $f^{18}$ to shift or carry the die sections laterally of said forward movement.

Referring again to the folding blades, and more particularly to Figs. 6 to 10 which show enlarged details thereof, it will be seen that adjacent the front edge of the back folding blade I provide a gage $h$, and preferably also provide end gages $h'$, which gage $h$ may be adjustable as by means of clamps $h^2$, which serve to lock the spring fingers $h^3$ in desired place. Fig. 6 indicates in dotted lines a collar blank in position. The end folds are made simultaneously with the back edge fold, as herein shown, being actuated by forward movement of the edge folding blade.

Viewing Fig. 3 it will be seen that I provide a fixed bracket $c^{18}$ having at its free end a diagonal groove $c^{19}$, in which operates a roll $c^{20}$ projecting from a bell crank $c^{21}$ pivoted at $c^{22}$ and having its opposite bifurcated arm $c^{23}$ operating on a stud $c^{24}$ projecting through a slot $c^{25}$ in the folder carrier from a plate $c^{26}$ movable diagonally along the underside of said carrier, see Fig. 7. The front edge of the plate $c^{26}$ bears against a stop $c^{27}$ of an end folding blade or wiper $c^{28}$, pivoted at $c^{29}$ on the rear folding blade and normally retracted by a spring $c^{30}$. The result is that as the rear folding blade is moved forward the bell crank $c^{21}$ simultaneously swings inwardly the pivoted wiper $c^{28}$, thereby simultaneously folding the rear edge $x$ and the end fold $x'$, thereby effectually avoiding any possibility of ragged or protruding edges.

Viewing Fig. 9 it will be seen that the front blade $c$ is adjustable relatively to its carrier plate $c^{31}$ by reason of the transverse slots $c^{32}$ and the longitudinal slots $c^{33}$ in which operate screw studs extending from the said carrier plate and plates $c^{26x}$ respectively, taken in connection with oblique slots $c^{34}$ in which operate set screws $c^{35}$ extending up from the plates $c^{26x}$, this construction making it possible to get the most accurate and delicate adjustment, it being understood that extreme accuracy is required for this kind of folding.

As the thicknesses of material vary for different grades and kinds of collars and other blanks I provide an accurately adjustable stop $c^{36}$, adjusted by a thumb screw $c^{37}$, see Fig. 13, thereby making it possible to raise or lower the rear portion or rearwardly extending portion of the folder, thereby varying the angle of the folding edge of the blade relatively to the bed or blank receiving means, to adjust the folder into proper position quickly so as to bring the folding blade in absolute parallelism with the material and make it possible to secure the best folding operation and creasing effect.

The worm wheel driving construction renders it impossible that any of the parts should slip or move accidentally forward or backward by mere momentum of parts, and this construction conduces materially to the accuracy with which the blanks are handled.

This feature of my invention resides not in providing a worm and worm wheel in connection with the machine, but in providing a lock or positive check (said worm and worm wheel being preferably used for this purpose) against any downward movement of the former, cross-head, and carrier arm due to the momentum of said parts. It is necessary in my machine that the downwardly moving parts should move with relative slowness in order to permit other movements to take place meanwhile without interference therewith, and yet it is necessary that the whole machine should work as rapidly as possible, and that no tendency to backward movement of the folding blade mechanism should take place when said blades are in or near folding position; and I secure the desired object by locating the worm and worm wheel in such position that the thrust of the teeth of the worm wheel, coming transversely of the teeth of the worm in line with the length of the latter, makes it impossible for any improper movement of the actuated parts.

A blank is put in position by the operator with its rear edges resting against the guide $h$, it being understood that if necessary the blades are adjusted as required in order to conform with the utmost nicety to the precise size of band which it is desired to fold. The blank having been put in position, the machine is started, and the cam $f^8$ operating through the bell crank $f^5$, $f^7$, and connecting link $f^4$ and arm $f^3$, lowers the cross-head on top of the blank, in which position it is firmly pinched by the engagement of the roll $f^{10}$ with the cam $f^{12}$, while the cam $b$ engages the arm $b^4$ and moves inwardly the spring elevated folding blade $c'$ so that the latter as it moves forward first lifts up the projecting edge of the blank and then folds it over on top of the die, whereupon the arm $g^6$ is moved forward by the path cam $g^4$, being first slightly relieved of pressure by the cam $f^{12}$. At the same time that the die is moved forward it is also contracted in length by the cam slots $f^{17}$, so that it may be drawn deftly out from the edge and end folds just made. As soon as the die is out from under the folds the cam $c^{14}$ immediately brings a severe creasing pressure upon the said blades. The die is restored to proper position over the blank and again pinched thereon by the cams $g^4$ and $f^{12}$, and the front folding blade is then moved forward by the engagement of the cam $b$ with the roll $b'$. As soon as the front fold is made the die is moved back from beneath said fold, and the latter is immediately creased by the action of the cam $c^{13}$. It will be understood that in making the complementary blanks the order of folding is reversed in order that the complementary or top and bottom folded parts which together constitute a complete band, may have folds capable of interlocking, as indicated in Figs. 16 and 17, one part or blank of the band being folded, as already described and as illustrated in Fig. 15, and the other part or blank or set of blanks being folded as indicated in Fig. 14, where the front edge fold is made first and the rear edge and end folds are made last.

I have above referred to the folding blades as being maintained under a normal tendency to rise and have described the rising of the infolder as preceding its forward or inward movement, this action serving to first lift up the projecting blank edge and then fold it over the top of the die. It should be explained that this result is materially assisted by a detail of construction shown for example in Figs. 3 and 13. $c$ and $c'$ are infolders which move inwardly and outwardly in contact with the upper surface of the bed of the machine. It will be noted, however, that I have not permitted the blank and die to rest directly upon the main surface of the bed plate but on the contrary have provided a slightly elevated surface in the form of a pad. Normally the infolders lie in a lowered position and out of the way of any horizontal movements which the die may take. Thus, as seen in Fig. 13, the upper surface of the infolder is flush with the upper surface of the pad and in this way I have accomplished the desired result. When the blank is positioned upon the pad, its edges project beyond the pad and over the spaces into which the infolders have dropped from the preceding action. This feature of a raised pad is extremely valuable in coöperation with the species of die hereinabove described, because it permits the free and untrammeled horizontal movement of the die in any desired direction, thus adding facility to the operation of the machine and obviating risk of damage either to the machine parts or to the blank, which might otherwise occur.

For the purposes of claim 16 and the series of claims beginning therewith, it may be explained that when the carrier moves reversely or to-and-fro on the frame of the crosshead, it carries the die sections or plates and at the same time causes the latter to move relatively to the carrier or at an angle to the carrier's movements. And when the die enlarges or diminishes the sections must of course move relatively to each other, in this instance toward and from each other. Also the said die section movements are effected from the frame, by which I mean there are connections between the frame and sections, which connections effect the section movements, and they do it by reason of the carrier movements. These connections include a die section controlling device mounted on the frame, such for example, as the inclined cam or slot $f^{18}$, Fig. 11, and its action is such that when the carrier shifts, the controlling device controls the die sections, automatically causing them to move or be moved relatively to the carrier. When I say a part moves "on" another part, e. g., the die section moves on the carrier, or the carrier moves on the frame, I mean it moves relatively to but in contact or engagement with the second part, which thus forms the foundation or base for the first part of its operation.

For the purposes of claims 1, 2 and certain others it may be stated that irrespective of whether the carrier $f^{22}$ has sidewise movement the lengthening and shortening of the die is of consequence in a machine like this where the blank is long and has to be infolded upon both ends and at least one of the long sides. For it will be recognized that the ends and especially the corners of such blanks are the critical portions; and, this being the case, the mere lengthwise contraction assists disengaging the folded blank and die whether the balance of the disengagement be accomplished by side shifting of carrier or otherwise. I have purposely arranged all the die sections in one plane, and they all occupy a single plane at all times whether expanded, contracted or moving. No section has to move out of the die's plane. The above features are important as enabling the machine to be adapted to long blanks which are quite narrow, and which formerly gave considerable trouble. Different ways have been devised for moving one or more of the sections a substantial distance out of the plane of the others, and all these with their objections I have obviated. I have found that it is not necessary to have the adjacent section edges of two sections immediately abutting against each other in the expanded die; for example I have shown an overlap in Fig. 12 which may be maintained in all die positions. This affords the important function of keeping all the die sections always in a single plane. Not only is it important in this aspect of my invention to maintain the sections in one plane, but also to maintain them in endwise alinement, and this is a characteristic of the machine illustrated, no die section having any lateral or sidewise movement relatively to any other section, and in fact all the sections are fixed against any sidewise movement with relation to the carrier beneath which they are all fitted, making the die as a whole of a fixed width. Thus greatest simplicity is secured, there being neither lateral or vertical movement of any plate relatively to the others and carrier, but only lengthwise movement. And this feature, moreover, renders the die peculiarly capable of coöperation with infolders that fold at once both blank end edges and at least one of the long side edges, especially with a narrow blank, wherein I have obviated need of contraction in all directions. It as well obviates the need of die mechanism in which more than one operative shortening movement is used to assist in the disengagement of blank and die, which would not be the case where the two ends are folded in successive operations, between which the die is extracted and replaced. The infolders of the machine of these claims are of the kind which when folding move inwardly substantially in the same plane with the die when in folding position, rather than at such an elevation as merely to bend without forming a sharp fold in the fabric. It is obvious that I use the word carrier in these claims as merely referring to a member that carries the die sections up and down or from and toward the bed.

Having described my invention, what I claim and desire to secure by Letters Patent is:—

1. In a machine for infolding both end edges and at least one of the long side edges of blanks that are long in shape as compared with their width, the combination of: a support for supporting the blanks to be infolded; a plurality of moving infolders having edges corresponding to the several blank edges to be infolded; a side shifting die carrier movable toward and from said support; a blank defining die carried by said carrier; said die being of fixed width and divided into a plurality of sections, at least one of which sections is movable endwise; all said sections being connected to said carrier to at all times whether moving or at rest have their defining portion in a single plane; a section actuating mechanism, said mechanism having connections for shifting said carrier sidewise and simultaneously causing the endwise movement of at least one of said sections whereby it may lengthen the die to outward blank-defining position and shorten it to an inward position to assist disengagement of the folded blank and die, and a single operative movement of said actuating mechanism serving to change the die from blank-defining position to completely shortened position; and mechanism for moving the infolders inwardly in substantially the same plane as the die when in folding position, so that said infolders may infold both of the end edges and at least one of the long side edges of the blank while the die rests stationarily over the blank.

2. In a machine for infolding both end edges and at least one of the long side edges of blanks that are long in shape as compared with their width, the combination of; a support for supporting the blanks to be infolded; a plurality of moving infolders having edges corresponding to the several blank edges to be infolded; a side shifting die carrier movable toward and from said support; a blank defining die carried by said carrier; said die being of fixed width and divided into a plurality of sections, both end sections of which are movable endwise; all said sections being connected to said carrier to at all times whether moving or at rest have their defining portions in a single plane; a section actuating mechanism, said mechanism having connections for shifting said carrier sidewise and simultaneously causing the endwise movements of both of said end sections whereby it may lengthen the die to outward blank-defining position, and shorten it to an inward position to assist disengagement of the folded blank and die, and a single operative movement of said actuating mechanism serving to change the die from blank-defining position to completely shortened position; and mechanism for moving the infolders inwardly in substantially the same plane as the die when in folding position, so that said infolders may infold both of the end edges and at least one of the long side edges of the blank, while the die rests stationarily over the blank.

3. In a machine for infolding both end edges and at least one of the long side edges of blanks that are long in shape as compared with their width, the combination of a support for supporting the blanks to be infolded; a plurality of moving infolders having edges corresponding to the several blank edges to be infolded; a member having movements toward and from said support; a blank defining die carried by said member, said die being of fixed width and divided into a plurality of sections, at least one of which sections is movable endwise; all said sections being connected to said member to at all times whether moving or at rest have their defining portions in a single plane; a section actuating mechanism, said mechanism having connections for causing the endwise movements of at least one of said sections whereby it may lengthen the die to outward blank-defining position, and shorten it to an inward position to assist disengagement of the folded blank and die, and a single operative movement of said actuating mechanism serving to change the die from blank-defining position to completely shortened position; mechanism for moving the infolders inwardly in substantially the same plane as the die when in folding position, so that said infolders may infold both of the end edges and at least one of the long side edges of the blank closely over the die edges, while the die rests stationarily over the blank; and a power shaft or part having mechanical connections extending to and for causing the said die-carrying member movements, for operating said section actuating mechanism, and for operating said infolder mechanism.

4. In a high speed power operated folding machine comprising folding mechanism and a die with which is comprised working mechanism for changing the position of die parts, the combination with said die, die parts and working mechanism, of a swinging die-positioning arm, at the outer end of which are carried said die, die parts and working mechanism, a shaft about which said arm swings, intermittently and in opposite directions, a worm wheel from which the movements of said arm are effected, and a fast running shaft adapted to be connected up with power mechanism, and provided with a worm engaging said worm wheel, all combined substantially as and for the purposes set forth.

5. In a machine for folding collars and the like, means for receiving a blank to be folded, folding mechanism, including a folder and means for yieldingly maintaining said folder normally in a position away from said receiving means, mechanism for shifting said folder laterally for infolding a blank, and a pinching device for pressing the said folder against a fold.

6. In a machine for folding collars and the like, folding mechanism, including a folder, end supports therefor freely movable up and down, said folder being slidingly supported in said end supports, and means for actuating said folder in combination with a raised pad above the level of which the folders may be raised in sequence.

7. In a machine for folding collars and the like, folding mechanism, including a folder, end supports therefor freely movable up and down, said folder being slidingly supported in said end supports, means loosely engaging said folder for shifting the same to infold a blank, and means for bringing pressure upon the folding edge of said folder.

8. In a machine for folding collars and the like, folding mechanism, including a folder, means for raising said folder and shifting the same inwardly to make a fold, means for bringing pressure upon the folding edge of said folder, and means at the rear portion of said folder for limiting the vertical movement of said folder.

9. In a machine for folding collars and the like, a folder for infolding an edge of a blank, means for moving said folder in and out, a second folder mounted on said folder, means movable along said first mentioned folder for operating said second folder, and actuating means therefor, including a cam surface in a stationary part of the machine, and a coöperating member movable with said first mentioned folder for engaging said cam surface.

10. In a machine for folding collars and the like, a folder movable in and out for folding, a pivoted folder mounted thereon, and means operable by the movement of said first mentioned folder for actuating said pivoted folder for making a fold simultaneously with the fold made by said first mentioned folder.

11. In a machine for folding collars and the like, a folder comprising a folding blade, a carrier therefor, and an adjusting plate for adjusting said blade, said adjusting plate being movable diagonally, and said blade being movable straight in, whereby extreme accuracy of adjustment may be secured without liability of the parts slipping in said adjustment.

12. In a machine for folding collars and the like, means for receiving a blank to be folded, means for holding said blank, means for folding the same, an operating mechanism for said parts, said mechanism including a drive shaft, a gear wheel carried thereby, and means also carried by said drive shaft for moving said folding mechanism in one direction, a shaft adjacent thereto and carrying a gear in mesh with said first mentioned gear, and means for causing other movements of said folding mechanism, and a third shaft geared to said second shaft and carrying mechanism for operating said holding means.

13. In a machine for folding collar blanks and the like, the combination of a support for supporting the blanks to be folded, a crosshead frame movable toward and from said support, a carrier reversely movable on said frame, means for causing carrier movements relatively to the frame, a die section movable on said carrier at an angle to said carrier movements, and connections between the frame and die section for effecting said die section movements from the frame and by the carrier movements.

14. In a machine for folding collar blanks and the like, the combination of a support for supporting the blanks to be folded, a crosshead frame movable toward and from said support, a carrier reversely movable on said frame, means for causing carrier movements relatively to the frame, a die section movable on said carrier at an angle to said carrier movement, and connections between the frame and die section for effecting said die section movements from the frame and by the carrier movements; together with power mechanism and connections therefrom for actuating the crosshead frame and the carrier moving means in harmony with each other.

15. In a machine for folding collar blanks and the like, the combination of a support for supporting the blanks to be folded, a crosshead frame movable toward and from said support, a carrier reversely movable on said frame, means for causing carrier movements relatively to the frame, a plurality of die sections movable on said carrier relatively to each other and at angles to said carrier movements, and connections between the frame and die section for effecting said die section movements from the frame and by the carrier movements.

16. In a machine for folding collar blanks and the like, the combination of a support for supporting the blanks to be folded, a crosshead frame movable toward and from said support, a carrier reversely movable on said frame, means for causing carrier movements relatively to the frame, one or more die sections, each die section movable on said carrier at an angle to said carrier movements, a section controlling device mounted on the frame, and connections between said device and die section for controlling said die section movements from the frame when effected by the carrier movements.

17. In a machine for folding collar blanks and the like, the combination of a support for supporting the blanks to be folded, a crosshead frame movable toward and from said support, a carrier reversely movable on said frame, means for causing carrier movements relatively to the frame, one or more die sections, each section movable on said carrier at an angle to said carrier movements, a part having a grinding portion oblique to the direction of the carrier movements, and a part sliding thereon, one of said parts being fixed upon the frame and the other part connected to said die section, whereby when the section is actuated from said carrier it is controlled from the frame to move relatively to the carrier.

18. In a machine for folding collar blanks and the like, the combination of a support for supporting the blanks to be folded, folding mechanism, a crosshead frame movable toward and from said support, a carrier horizontally shiftable to and fro on said frame, a die, said die comprising sections horizontally movable relatively to said carrier and on guides or ways in said carrier, whereby the die as a whole may be enlarged and diminished, and a single actuating part which is provided with mechanical connections to the carrier and section by which connections it simultaneously effects the horizontal carrier shifting movements and the horizontal section movements, resulting in section movements diagonal to the longitudinal axis of the die.

19. In a machine for folding collar blanks and the like, the combination of a support for supporting the blanks to be folded, folding mechanism, a crosshead frame movable toward and from said support, a carrier horizontally shiftable to and fro on said frame, a die, said die comprising sections horizontally movable relatively to said carrier and on guides or ways in said carrier, whereby the die as a whole may be enlarged and diminished, and a single actuating part, as $g^6$, having fittings which movably fit it to the crosshead, and said actuating part provided with mechanical connections to the carrier and section by which connections it simultaneously effects the horizontal carrier shifting movements and the horizontal section movements, resulting in section movements diagonal to the longitudinal axis of the die.

20. In a machine for folding collar blanks and the like, the combination of a support for supporting the blanks to be folded, folding mechanism, a crosshead frame movable toward and from said support, power mechanism for actuating said folding mechanism and said frame in harmony, a carrier horizontally shiftable to and fro on said frame, die sections horizontally movable on guides or ways in said carrier, whereby the die as a whole may be enlarged and diminished, a single actuating part as $g^6$ which partakes of the crosshead movements yet is movable with respect to the crosshead and is operated by connections from said power mechanism, a controlling device, as $f^{17}$, on said frame, and connections from said actuating part and from said controlling device extending to, and for coöperatively effecting and controlling the movements of said carrier and said sections, to produce section movements diagonal to the longitudinal axis of the die.

21. In a machine for folding collar blanks and the like, the combination of a support for supporting the blanks to be folded, folding mechanism, a crosshead frame movable toward and from said support, power mechanism for actuating said folding mechanism and said frame in harmony, a carrier horizontally shiftable to and fro on said frame, die sections horizontally movable on guides or ways in said carrier, whereby the die as a whole may be enlarged and diminished, a single actuating part as $g^6$ which partakes of the crosshead movements and is movable with respect to the crosshead and is operated from said power mechanism through a connection which remains connected in all positions of the crosshead, a controlling device, as $f^{17}$, on said frame, and connections from said actuating part and from said controlling device extending to said carrier and sections for conjointly effecting the movements thereof and thereby controlling the resultant movements of said sections.

22. In a machine for folding collars and the like, crosshead mechanism, comprising a supporting frame having cam surfaces stationary relative to the supporting frame with relation to which the die moves, a die formed with sections, a die carrier, guides for said die carrier permitting the same to move back and forth, the said die connected with said carrier for movement in a direction transverse to the direction of movement of said carrier, and said die being provided with intermediate connections by which it is governed in its movements by said cam surfaces, and means for shifting said die carrier and thereby giving a compound movement to said die.

23. In a folding machine, a templet comprising blank defining plates, a crosshead, mechanism carried by the crosshead for effecting movements of said plates, a bar as $g^6$ for actuating said mechanism, said bar movable lengthwise toward and from said crosshead, and a cam turning on the same axis as said swinging arms, with cam connections for longitudinally moving said bar whereby the movements of said plates may be power controlled without respect to the swinging movement.

24. In a folding machine, a templet comprising blank defining plates, a crosshead, mechanism carried by the crosshead for effecting movements of said plates, a bar as $g^6$ for actuating said mechanism, said bar movable lengthwise toward and from said crosshead, and having a yoke at its far end, and a cam turning on the same axis as said swinging arms, with cam connections for longitudinally moving said bar, whereby the movements of said plates may be power controlled without respect to the swinging movement.

25. In a folding machine, a templet comprising a crosshead swingingly mounted, a bar slidingly fitted in said crosshead, templet plates with connection for transmitting movement from said bar, and means located substantially at the axis of swinging of said crosshead for sliding said bar.

26. A folding machine comprising a crosshead fitted to swing about a given axis, a bar as $g^6$ slidingly fitted to said crosshead and extending toward said axis, connections on said crosshead whereby the sliding of said bar may actuate the templet, and means located substantially at the axis of swinging of said crosshead acting on the end of said bar nearest said axis for reciprocating said bar.

27. In a machine for folding collars and the like, a die, a pivotal support therefor for swinging the same up and down, means coöperating with said die for retaining a blank to be folded, folding mechanism for infolding edges of said blank, said die being composed of a plurality of parts expansible and contractible, a bar extending rearward from the die toward the axis of said swinging movement and fitted for forward and rearward reciprocation relatively to said pivotal support, connections between the forward end of said bar and said parts whereby said reciprocation may effect the expansion and contraction of said parts, and a means located near said axis of swinging movement cooperating with the rear end of said bar for causing such reciprocation.

28. In a machine for folding collars and the like, a die, a pivotal support therefor for swinging the same up and down, means cooperating with said die for retaining a blank to be folded, folding mechanism for infolding edges of said blank, said die comprising fold defining plates at least one of which is horizontally movable relatively to said blank retaining means, a bar extending rearward from the die toward the axis of said swinging movement and fitted for forward and rearward reciprocation relatively to said pivotal support, connections at the forward end of said bar whereby said reciprocation may effect the movement of said plate or plates, and a means located near said axis of swinging movement coöperating with the rear end of said bar for causing such reciprocation.

29. In a machine for folding collars and the like, a die, a pivotal support therefor for swinging the same up and down, means cooperating with said die for retaining a blank to be folded, folding mechanism for infolding edges of said blank, said die comprising fold defining plates at least one of which is horizontally movable relatively to said blank retaining means, a bar extending rearward from the die toward the axis of said swinging movement and fitted for forward and rearward reciprocation relatively to said pivotal support, and connections at the forward end of said bar whereby said reciprocation may effect the movements of said plate or plates.

30. In a machine for folding collars and the like, a die, a pivotal supporting arm therefor for swinging the same up and down, means coöperating with said die for retaining a blank to be folded, folding mechanism for infolding edges of said blank, said die comprising a body portion and fold defining plates at least one of which is movable relatively to said body portion, a bar extending rearward from the die toward the axis of said swinging movement and fitted for forward and rearward reciprocation relatively to said supporting arm, connections at the forward end of said bar whereby said reciprocation may effect the movements of said plates, and connections near said axis of swinging coöperating with the rear end of said bar for causing such reciprocation.

31. In a machine for folding blanks for collars and the like, the combination of a means for retaining the blanks to be folded, a swinging die having a body portion and a fold defining plate movable relatively to said body, and two arms extending from the templet rearward toward its axis of swinging, one arm secured to the templet body and fitted at its rear end to receive swinging movement, and the second arm connected at its front end for operation of said movable plate and having connections at its rear end for causing relative forward-and-backward movements as between said two arms whereby said second arm may operate said plate.

32. In a machine for folding blanks for collars and the like, the combination of a means for retaining the blanks to be folded, a swinging die having a body portion and a fold defining plate movable relatively to said body, and two arms extending from the templet rearward toward its axis of swinging, one arm secured to the templet body and fitted at its rear end to receive swinging movements, and the second arm connected at its front end for operation of said movable plate and having an automatically actuated device at its rear end for causing relative forward-and-backward movement as between said two arms whereby said second arm may operate said plate.

33. In a machine for folding collar blanks and the like, a support for the blanks to be folded, a crosshead frame, means for lowering and raising said frame, a carrier having a middle folding position and movable relatively to said frame in two opposite directions from middle position, a sectional die supported on said carrier and so fitted thereto as to have at least one of its sections movable inwardly and outwardly relatively to said carrier along a line of direction at an angle to the line of direction of said carrier movement, means for causing said carrier movements, and means coöperating with said carrier moving means for simultaneously causing said inward movements of the die section upon the movement of said carrier in either direction from middle position.

34. In a machine for folding collar blanks and the like, a support for the blanks to be folded, a crosshead frame, means for lowering and raising said frame, a carrier having a middle folding position and movable relatively to said frame in two opposite directions from middle position, a sectional die supported on said carrier and so fitted thereto as to have at least one of its sections movable inwardly and outwardly relatively to said carrier along a line of direction at an angle to the line of direction of said carrier movement, means for causing said carrier movements, and a double-acting automatic means coöperating with said carrier moving means for simultaneously causing said inward movements of the die section upon the movement of said carrier in either direction from middle position.

35. In a machine for folding collar blanks and the like, a support for the blanks to be folded, a crosshead frame, means for lowering and raising said frame, a carrier having a middle folding position and movable relatively to said frame in two opposite directions from middle position, a sectional die supported on said carrier and so fitted thereto as to have at least one of its sections movable inwardly and outwardly relatively to said carrier along a line of direction at an angle to the line of direction of said carrier movement, means for causing said carrier movements, and a device including a two-part cam and engaging pin, one on said die the other on said frame, for simultaneously causing said inward movements of the die section upon the movement of said carrier in either direction from middle position.

36. In a machine for folding collar blanks and the like, a support for the blanks to be folded, a crosshead frame, means for lowering and raising said frame, a carrier having a middle folding position and movable relatively to said frame in two opposite directions from middle position, a sectional die supported on said carrier and so fitted thereto as to have a plurality of its sections movable inwardly and outwardly relatively to said carrier along a line of direction at an angle to the line of direction of said carrier movement but in opposite directions, means for causing said carrier movements, and means coöperating with said carrier moving means for simultaneously causing inward movements of both the die sections upon the movement of said carrier in either way from middle position.

37. In a machine for folding collar blanks and the like, a support for the blanks to be folded, a crosshead frame, means for lowering and raising said frame, a carrier having a middle folding position and movable relatively to said frame in two opposite directions from middle position, a sectional die supported on said carrier and so fitted thereto as to have a plurality of its sections movable inwardly and outwardly relatively to said carrier along a line of direction at an angle to the line of direction of said carrier movement but in opposite directions, means for causing said carrier movements, and a double-acting automatic device coöperating with said carrier moving means for simultaneously causing inward movements of both the die sections upon the movement of said carrier in either way from middle position.

38. In a machine for folding collar blanks and the like, a support for the blanks to be folded, a crosshead frame, means for lowering and raising said frame, a carrier having a middle folding position and movable relatively to said frame in two opposite directions from middle position, a sectional die supported on said carrier and so fitted thereto as to have a plurality of its sections movable inwardly and outwardly relatively to said carrier along a line of direction at an angle to the line of direction of said carrier movement but in opposite directions, means for causing said carrier movements, and a device including a two-part cam and a member engaging the same, one upon said die the other on said frame, coöperating with said carrier moving means for simultaneously causing inward movements of both the die sections upon the movement of said carrier in either way from middle position.

39. In a folding machine a blank support, a crosshead, means for lowering and raising said crosshead, a sectional die supported beneath said crosshead and fitted to be as a whole movable to and fro relatively to said crosshead along a given line of direction, means for moving said die relatively to said crosshead, and an automatically acting device on said crosshead for causing the movements of the die sections relatively toward each other upon the die's bodily movement in either direction from a middle position whereby the actual die section movements are along resultant diagonal lines.

40. In a folding machine a blank support, a crosshead, means for lowering and raising said crosshead, a sectional die supported beneath said crosshead and fitted to be as a whole movable to and fro relatively to said crosshead along a given line of direction, means for moving said die relatively to said crosshead, and an automatically acting device including a fixed double oblique cam and a member engaging it, one on said die the other on said crosshead for causing the movements of the die sections relatively toward each other upon the die's bodily movement in either direction from a middle position whereby the actual die section movements are along resultant diagonal lines.

41. In a folding machine a blank support, a crosshead, means for lowering and raising said crosshead, a sectional die supported beneath said crosshead and fitted to be as a whole movable to and fro relatively to said crosshead along a given line of direction, means for moving said die relatively to said crosshead, and an automatically acting device for each die section, including a V-shaped cam on said crosshead for causing the movements of the die sections relatively toward each other upon the die's bodily movement in either direction from a middle position whereby the actual die section movements are along resultant diagonal lines.

42. In a machine for folding collar blanks and like articles, the combination of a support having a supporting surface for the blanks, a die movable toward and from said support, said die constructed substantially integral in its width and having a median position and movable horizontally therefrom laterally in either direction, guiding means for guiding the die in its horizontal lateral movements in both directions, mechanism for shifting the die toward one side for extracting it from part of the folded edges, for replacing it in median position and for moving it laterally toward the other side for extracting it from other folded edges, a plurality of infolders, and mechanism for moving such infolders inwardly and outwardly dissimultaneously in harmony with the die movements, said infolders adapted to be lowered below said supporting surface when inoperative.

43. In a machine for folding collar blanks and like articles, the combination of a support for supporting the blanks, a die movable toward and from said support, said die constructed substantially integral in its width and having a median position and movable horizontally therefrom laterally in either direction, mechanism for shifting the die toward one side for extracting it from part of the folded edges, for replacing it in median position and for moving it laterally toward the other side for extracting it from other folded edges, a plurality of infolders, and mechanism for moving such infolders inwardly and outwardly dissimultaneously in harmony with the die movements, said infolders adapted to be lowered out of the way of the die when inoperative; and said blank-support being in the form of a raised pad affording room for lowering the infolders when in outward position.

44. In a machine for folding collar blanks and like articles, the combination of a support having a supporting surface for the blanks, a die movable toward and from said support, said die constructed substantially integral in its width, and being movable horizontally when in lowered position, mechanism for moving the die horizontally for disengaging it from a part of the blank, a plurality of infolders and mechanism for moving such infolders inwardly and outwardly for folding edge portions of the blanks over edge portions of the die and for moving such infolders downwardly below said supporting surface when in outward position.

45. In a machine for infolding blanks having a long narrow shape, the combination of a horizontal support for supporting the blanks, a die movable toward and from said support and having horizontal bodily shifting movements when in lowered position, guiding means for guiding the die in said horizontal shifting movements, a plurality of infolders, mechanism for operating said infolders to dissimultaneously produce folds on said blank, for on one operation of said mechanism infolding a blank edge portion including a long side edge and both ends, and upon another operation thereof the remainder, and means for horizontally shifting the die in harmony with said infolders so that it may be horizontally extracted from the folds first formed and replaced thereover for the folding of the remaining edges.

46. In a machine for infolding blanks having a long narrow shape, the combination of a horizontal support for supporting the blanks, a die movable toward and from said support and having horizontal bodily shifting movements when in lowered position, guiding means for guiding the die in said horizontal shifting movements, mechanism for causing said die to shorten simultaneously with its shifting, a plurality of infolders, mechanism for operating said infolders to dissimultaneously produce folds on said blank, for on one operation of said mechanism infolding a blank edge portion including a long side edge and both ends, and upon another operation thereof the remainder, and means for horizontally shifting the die in harmony with said infolders so that it may be horizontally extracted from the folds first formed and replaced thereover for the folding of the remaining edges.

47. In a machine for infolding blanks having a long narrow shape, the combination of a horizontal support for supporting the blanks, a die movable toward and from said support and having horizontal bodily shifting movements when in lowered position, mechanism for causing said die to shorten simultaneously with its shifting, a plurality of infolders, mechanism for operating said infolders to dissimultaneously produce folds on said blank, for on one operation of said mechanism infolding a blank edge portion including a long side edge and both ends, and upon another operation thereof the remainder, means for horizontally shifting the die in harmony with said infolders so that it may be horizontally extracted from the folds first formed and replaced thereover for the folding of the remaining edges; and means for lowering the infolders below and out of the path of movement of the die when inoperative.

48. In a machine for folding collar blanks and the like, a support for the blanks to be folded, a die carrier having means for lowering it toward said support and raising it, mechanism for shifting said carrier in either of two directions horizontally from a normal or folding position, a plurality of die sections carried on said carrier and so fitted thereto as to move toward and from each other, mechanism for shifting the carrier from a normal or folding position in either of two directions and for simultaneously moving said sections toward each other, whereby whenever the die shifts away from a side of the blank its sections always draw away from both ends thereof.

49. In a machine for folding collar blanks and the like, a support for the blanks to be folded, a die carrier having means for lowering it toward said support and raising it, mechanism for shifting said carrier in either of two directions horizontally from a normal or folding position, a plurality of die sections carried on said carrier and so fitted thereto as to move toward and from each other, mechanism for shifting the carrier from a normal or folding position in either of two directions and an automatic device comprising a cam and a pin, which, when the carrier shifts, simultaneously causes said sections to move toward each other, whereby whenever the die shifts away from a side of the blank its sections always draw away from both ends thereof.

50. In a machine for folding collar blanks and the like, a support for the blanks to be folded, a die carrier having means for lowering it toward said support and raising it, mechanism for shifting said carrier in either of two directions horizontally from a normal or folding position, a plurality of die sections carried on said carrier and so fitted thereto as to move toward and from each other, mechanism for shifting the carrier from a normal or folding position in either of two directions and an automatic device comprising a fixed V-shaped cam and a pin, which, when the carrier shifts, simultaneously causes said sections to move toward each other, whereby whenever the die shifts away from a side of the blank its sections always draw away from both ends thereof.

51. In a machine for folding collar blanks and the like, a support for the blanks to be folded, a die carrier having means for lowering it toward said support and raising it, mechanism for shifting said carrier in either of two directions horizontally from a normal or folding position, a plurality of die sections carried on said carrier and so fitted thereto as to move toward and from each other, mechanism for shifting the carrier from a normal or folding position in either of two directions and for simultaneously moving said sections toward each other, whereby whenever the die shifts away from a side of the blank its sections always draw away from both ends thereof, and infolders having mechanism for causing them to move inward and outward and when in outward position to move upward and downward, the said blank support comprising a raised blank receiving pad which permits the infolders to move downward below the path of the die when in outward position.

52. In a machine for folding collar blanks and the like, a support for the blanks to be folded, a die carrier having means for lowering it toward said support and raising it, mechanism for shifting said carrier in either of two directions horizontally from a normal or folding position, a plurality of die sections carried on said carrier and so fitted thereto as to move toward and from each other, mechanism for shifting the carrier from a normal or folding position in either of two directions and an automatic device comprising a fixed V-shaped cam and a pin, which, when the carrier shifts, simultaneously causes said sections to move toward each other, whereby whenever the die shifts away from a side of the blank its sections always draw away from both ends thereof, and infolders having mechanism for causing them to move inward and outward and when in outward position to move upward and downward, the said blank support comprising a raised blank receiving pad which permits the infolders to move downward below the path of the die when in outward position.

In testimony whereof, I have signed my name to this specification, in the presence of two subscribing witnesses.

GEORGE REECE.

Witnesses:
Geo. H. Maxwell,
Geo. W. Gregory.

---

Corrections in Letters Patent No. 972,916.

It is hereby certified that in Letters Patent No. 972,916, granted October 18, 1910, upon the application of George Reece, of Wollaston, Massachusetts, for an improvement in "Collar and Cuff Folding Machines," errors appear in the printed specification requiring correction as follows: Page 2, lines 28–29, the word "oppositively" should read *oppositely;* page 6, line 95, the word "grinding" should read *guiding;* page 8, lines 17 and 37, the words "plate or" should be stricken out; and that the said Letters Patent should be read with these corrections therein that the same may conform to the record of the case in the Patent Office.

Signed and sealed this 3d day of January, A. D., 1911.

[SEAL.]

E. B. MOORE,
*Commissioner of Patents.* be folded, a die carrier having means for lowering it toward said support and raising it, mechanism for shifting said carrier in either of two directions horizontally from a normal or folding position, a plurality of die sections carried on said carrier and so fitted thereto as to move toward and from each other, mechanism for shifting the carrier from a normal or folding position in either of two directions and an automatic device comprising a cam and a pin, which, when the carrier shifts, simultaneously causes said sections to move toward each other, whereby whenever the die shifts away from a side of the blank its sections always draw away from both ends thereof.

50. In a machine for folding collar blanks and the like, a support for the blanks to be folded, a die carrier having means for lowering it toward said support and raising it, mechanism for shifting said carrier in either of two directions horizontally from a normal or folding position, a plurality of die sections carried on said carrier and so fitted thereto as to move toward and from each other, mechanism for shifting the carrier from a normal or folding position in either of two directions and an automatic device comprising a fixed V-shaped cam and a pin, which, when the carrier shifts, simultaneously causes said sections to move toward each other, whereby whenever the die shifts away from a side of the blank its sections always draw away from both ends thereof.

51. In a machine for folding collar blanks and the like, a support for the blanks to be folded, a die carrier having means for lowering it toward said support and raising it, mechanism for shifting said carrier in either of two directions horizontally from a normal or folding position, a plurality of die sections carried on said carrier and so fitted thereto as to move toward and from each other, mechanism for shifting the carrier from a normal or folding position in either of two directions and for simultaneously moving said sections toward each other, whereby whenever the die shifts away from a side of the blank its sections always draw away from both ends thereof, and infolders having mechanism for causing them to move inward and outward and when in outward position to move upward and downward, the said blank support comprising a raised blank receiving pad which permits the infolders to move downward below the path of the die when in outward position.

52. In a machine for folding collar blanks and the like, a support for the blanks to be folded, a die carrier having means for lowering it toward said support and raising it, mechanism for shifting said carrier in either of two directions horizontally from a normal or folding position, a plurality of die sections carried on said carrier and so fitted thereto as to move toward and from each other, mechanism for shifting the carrier from a normal or folding position in either of two directions and an automatic device comprising a fixed V-shaped cam and a pin, which, when the carrier shifts, simultaneously causes said sections to move toward each other, whereby whenever the die shifts away from a side of the blank its sections always draw away from both ends thereof, and infolders having mechanism for causing them to move inward and outward and when in outward position to move upward and downward, the said blank support comprising a raised blank receiving pad which permits the infolders to move downward below the path of the die when in outward position.

In testimony whereof, I have signed my name to this specification, in the presence of two subscribing witnesses.

GEORGE REECE.

Witnesses:
  Geo. H. Maxwell,
  Geo. W. Gregory.

---

Corrections in Letters Patent No. 972,916.

It is hereby certified that in Letters Patent No. 972,916, granted October 18, 1910, upon the application of George Reece, of Wollaston, Massachusetts, for an improvement in "Collar and Cuff Folding Machines," errors appear in the printed specification requiring correction as follows: Page 2, lines 28–29, the word "oppositively" should read *oppositely;* page 6, line 95, the word "grinding" should read *guiding;* page 8, lines 17 and 37, the words "plate or" should be stricken out; and that the said Letters Patent should be read with these corrections therein that the same may conform to the record of the case in the Patent Office.

Signed and sealed this 3d day of January, A. D., 1911.

[SEAL.]

E. B. MOORE,
*Commissioner of Patents.*

It is hereby certified that in Letters Patent No. 972,916, granted October 18, 1910, upon the application of George Reece, of Wollaston, Massachusetts, for an improvement in "Collar and Cuff Folding Machines," errors appear in the printed specification requiring correction as follows: Page 2, lines 28-29, the word "oppositively" should read *oppositely;* page 6, line 95, the word "grinding" should read *guiding;* page 8, lines 17 and 37, the words "plate or" should be stricken out; and that the said Letters Patent should be read with these corrections therein that the same may conform to the record of the case in the Patent Office.

Signed and sealed this 3d day of January, A. D., 1911.

[SEAL.]

E. B. MOORE,
*Commissioner of Patents.*